United States Patent
Zeng et al.

(10) Patent No.: US 9,721,461 B2
(45) Date of Patent: Aug. 1, 2017

(54) METHOD, APPARATUS AND SYSTEM FOR AFFIRMING ALARM IDENTITY OF VIDEO MONITORING SYSTEM

(71) Applicant: ZTE Corporation, Shenzhen, Guangdong (CN)

(72) Inventors: Wei Zeng, Shenzhen (CN); Liang Xu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 220 days.

(21) Appl. No.: 14/431,997

(22) PCT Filed: Aug. 27, 2013

(86) PCT No.: PCT/CN2013/082407
§ 371 (c)(1),
(2) Date: Apr. 22, 2015

(87) PCT Pub. No.: WO2014/048206
PCT Pub. Date: Apr. 3, 2014

(65) Prior Publication Data
US 2015/0262473 A1    Sep. 17, 2015

(30) Foreign Application Priority Data
Sep. 28, 2012  (CN) .......................... 2012 1 0370511

(51) Int. Cl.
*G08B 29/18* (2006.01)
*G08B 27/00* (2006.01)
(Continued)

(52) U.S. Cl.
CPC ......... *G08B 29/185* (2013.01); *G08B 25/002* (2013.01); *G08B 27/006* (2013.01);
(Continued)

(58) Field of Classification Search
CPC .. G08B 25/002; G08B 27/006; G08B 29/185; G08B 25/001; G08B 25/08; G08B 13/19658; H04N 7/18
See application file for complete search history.

(56) References Cited

U.S. PATENT DOCUMENTS 6,658,091 B1 * 12/2003 Naidoo ............ G08B 13/19669
                                                          379/37
7,559,081 B2    7/2009 Seidlein
(Continued)

FOREIGN PATENT DOCUMENTS

CN    1417064 A      5/2003
CN    101127133 A    2/2008
(Continued)

OTHER PUBLICATIONS

International Search Report in international application No. PCT/CN2013/082407, mailed on Dec. 12, 2013.
(Continued)

*Primary Examiner* — Huy T Nguyen
(74) *Attorney, Agent, or Firm* — Oppedahl Patent Law Firm LLC (57) ABSTRACT

Disclosed are a method, an apparatus and a system for affirming alarm identity of a video monitoring system. The method comprises: detecting an alarm of front-end, and notifying a mobile phone signal detecting unit to collect mobile phone signal in correspondence with a monitoring area according to the detecting operation; analyzing the mobile phone signal, and sending an alarm affirming message to an analyzed mobile phone number; and selecting whether to cancel the alarm of front-end according to an acquired alarm affirming feedback message. The method for affirming alarm identity of the video monitoring system provided by the present invention can be actualized conveniently in the video monitoring system, and the reliability is
(Continued)

high, wherein the referred correlative preset condition can be set flexibly, and the alarm accuracy of the video monitoring system is improved.

9 Claims, 5 Drawing Sheets (51) Int. Cl.
*H04N 7/18* (2006.01)
*G08B 25/00* (2006.01)
G08B 13/196 (2006.01)
G08B 25/08 (2006.01)

(52) U.S. Cl.
CPC ......... *H04N 7/18* (2013.01); *G08B 13/19658* (2013.01); *G08B 25/001* (2013.01); *G08B 25/08* (2013.01)

(56) References Cited

U.S. PATENT DOCUMENTS

| 2004/0189460 A1 | 9/2004 | Heaton |
| 2005/0066179 A1 | 3/2005 | Seidlein |
| 2008/0284580 A1* | 11/2008 | Babich ............. G08B 13/19684 340/502 |
| 2009/0181640 A1* | 7/2009 | Jones .................. G08B 13/196 455/404.2 |
| 2011/0227730 A1 | 9/2011 | Stevenson |

FOREIGN PATENT DOCUMENTS

| CN | 101227499 A | 7/2008 |
| CN | 102457710 A | 5/2012 |
| WO | 02061706 A1 | 8/2002 |
| WO | 2004012163 A2 | 2/2004 |

OTHER PUBLICATIONS

English Translation of the Written Opinion of the International Search Authority in international application No. PCT/CN2013/082407, mailed on Dec. 12, 2013.

Supplementary European Search Report in European application No. 13840255.7, mailed on Oct. 6, 2015.

\* cited by examiner

METHOD, APPARATUS AND SYSTEM FOR AFFIRMING ALARM IDENTITY OF VIDEO MONITORING SYSTEM

TECHNICAL FIELD

The disclosure relates to the field of communications, and in particular to a method, apparatus, and system for alarm identification for a video surveillance system.

BACKGROUND

A very important application of a video surveillance system is for a camera front-end alarm, generally including a motion-detected alarm, an access control alarm, or the like. At present, after a camera front-end alarm of a video surveillance system is produced, the alarm is not removed unless an administrator determines alarm information in the system and performs alarm clearance manually, or is automatically cleared after lasting for a threshold duration.

However, with a method for generating a front-end alarm as set by an existing camera front end, a false alarm tends to be produced. For example in applying a motion-detected alarm, the video surveillance system will issue an alarm once it is found through a camera front end that someone moves in a monitored area. However, the one moving in the monitored area monitored by a camera may often be just surveillance staff. After such an alarm appears, video surveillance system maintenance personnel is generally required to manually identify the alarm in the system and perform alarm clearance in real time. Otherwise, the produced alarm information may be automatically cleared by the system only after a period of time (such as 5 minutes or any other preconfigured period of time), and stored as historical alarm information.

In addition, when retrieving historical alarm information from the system, the video surveillance system maintenance personnel can retrieve but that a camera has produced an alarm and time when the alarm is produced. This is not conductive for performing later by the video surveillance system, accurate statistics and sorting of alarms produced within a period of time in the monitored area. Meanwhile, in an existing video surveillance system, an alarm source in the monitored area is identified mainly by means of face recognition or the like. However, effect with face recognition is often compromised due to impact of a factor such as quality of a monitored image (reduced quality of a monitored image caused by cloudy weather, poor light, or the like, for example), an alarm source disguise, or the like, such that cases such as a false alarm or lack of an alarm, or the like frequently occur at an existing video surveillance system.

Therefore, at present there is a pressing need for providing, for an existing video surveillance system, a method for alarm identification, capable of: after an alarm appears, performing effective identification on an alarm source, preventing a false alarm or lack of an alarm, and providing an accurate basis for subsequent alarm historical data statistics and sorting.

SUMMARY

In view of this, embodiments herein provide a method, apparatus, and system for alarm identification for a video surveillance system.

To this end, a technical solution herein is implemented as follows.

A method for alarm identification for a video surveillance system includes that:

a front-end alarm is detected, and a mobile-phone-signal intercepting unit is notified to collect a mobile phone signal in a monitored area corresponding to the front-end alarm;

the mobile phone signal is parsed, and an alarm identification message is sent to a mobile phone number obtained by the parsing; and it is determined, according to an acquired alarm identification feedback message, whether to eliminate the front-end alarm.

The front-end alarm may include a motion-detected alarm and an access control alarm.

The step of parsing the mobile phone signal, and sending an alarm identification message to a mobile phone number obtained by the parsing may include that:

the mobile phone signal is parsed and the mobile phone number corresponding to the front-end alarm is acquired; and it is determined, according to a preset alarm identification strategy, whether to send the mobile phone number corresponding to the front-end alarm the alarm identification message.

After all steps are executed, the front-end alarm may be recorded in a historical alarm repository, and the mobile phone number corresponding to the front-end alarm may be recorded at the same time to provide a basis for subsequent alarm information statistics and sorting.

It may be determined, according to an acquired alarm identification feedback message, whether to eliminate the front-end alarm by:

when no alarm identification feedback message corresponding to the alarm identification message is acquired within a preset waiting time, determining, according to a preset first alarm eliminating strategy, whether to eliminate the front-end alarm; labeling the front-end alarm as an identity-unidentified alarm; and recording the labeled front-end alarm in the historical alarm repository;

or, when the alarm identification feedback message corresponding to the alarm identification message is acquired within the preset waiting time, determining, according to a preset second alarm eliminating strategy, whether to eliminate the front-end alarm; and recording the front-end alarm and the mobile phone number corresponding to the front-end alarm in the historical alarm repository.

An apparatus for alarm identification for a video surveillance system includes:

a detecting unit configured for detecting a front-end alarm;

a mobile-phone-signal intercepting unit configured for: when the detecting unit detects a front-end alarm, collecting a mobile phone signal in a monitored area corresponding to the front-end alarm;

a first processing unit configured for: parsing the mobile phone signal, and sending an alarm identification message to a mobile phone number obtained by the parsing; and a second processing unit configured for: determining, according to an acquired alarm identification feedback message, whether to eliminate the front-end alarm.

The front-end alarm may include a motion-detected alarm and an access control alarm.

The first processing unit may be configured for parsing the mobile phone signal and sending an alarm identification message to a mobile phone number obtained by the parsing by:

parsing the mobile phone signal and acquiring the mobile phone number corresponding to the front-end alarm; and determining, according to a preset alarm identification strategy, whether to send the mobile phone number corresponding to the front-end alarm the alarm identification message.

The apparatus may further include:

a historical alarm repository configured for: after the second processing unit determines, according to the acquired alarm identification feedback message, whether to eliminate the front-end alarm, recording the front-end alarm in the historical alarm repository, and recording the mobile phone number corresponding to the front-end alarm to provide a basis for subsequent alarm information statistics and sorting.

The second processing unit may be configured for: determining, according to the acquired alarm identification feedback message, whether to eliminate the front-end alarm by:

when no alarm identification feedback message corresponding to the alarm identification message is acquired within a preset waiting time, determining, according to a preset first alarm eliminating strategy, whether to eliminate the front-end alarm; labeling the front-end alarm as an identity-unidentified alarm; and recording the labeled front-end alarm in the historical alarm repository;

or, when the alarm identification feedback message corresponding to the alarm identification message is acquired within the preset waiting time, determining, according to a preset second alarm eliminating strategy, whether to eliminate the front-end alarm; and recording the front-end alarm and the mobile phone number corresponding to the front-end alarm in the historical alarm repository.

A video surveillance system includes an aforementioned apparatus for alarm identification for a video surveillance system. The apparatus may include:

a detecting unit configured for detecting a front-end alarm;

a mobile-phone-signal intercepting unit configured for: when the detecting unit detects a front-end alarm, collecting a mobile phone signal in a monitored area corresponding to the front-end alarm;

a first processing unit configured for: parsing the mobile phone signal, and sending an alarm identification message to a mobile phone number obtained by the parsing; and a second processing unit configured for: determining, according to an acquired alarm identification feedback message, whether to eliminate the front-end alarm.

With a technical solution according to an embodiment herein, the method for alarm identification for a video surveillance system may be conveniently implemented in a video surveillance system with high reliability. A related preset condition may be set flexibly, improving alarm accuracy of the video surveillance system.

Implementation, functional features, and beneficial effects of the disclosure will be further described below with reference to embodiments and drawings.

DETAILED DESCRIPTION

A technical solution herein is further elaborated below with reference to drawings and embodiments, such that those skilled in the art may better understand and implement the disclosure. However the exemplary embodiments should not be taken as limiting the disclosure.

According to an embodiment herein, in a monitored area monitored by a camera of a video surveillance system, by collecting a mobile phone signal appearing in the monitored area using a mobile-phone-signal intercepting unit, parsing a collected mobile phone signal, storing a mobile phone number corresponding to the parsed signal, and incorporating the mobile phone number into an alarm flow of the video surveillance system, when a front-end alarm occurs in the video surveillance system, identification may be performed by sending the mobile phone number appearing in the monitored area an alarm identification message (such as in form of a short message), such that an alarm source may be warned and identified. With the method, when an alarm is recorded in a historical alarm repository, a mobile phone number appearing in a monitored area while the alarm occurs may be recorded as well, thereby providing effective identity data for subsequent alarm statistics and sorting in the monitored area.

Figure 1:
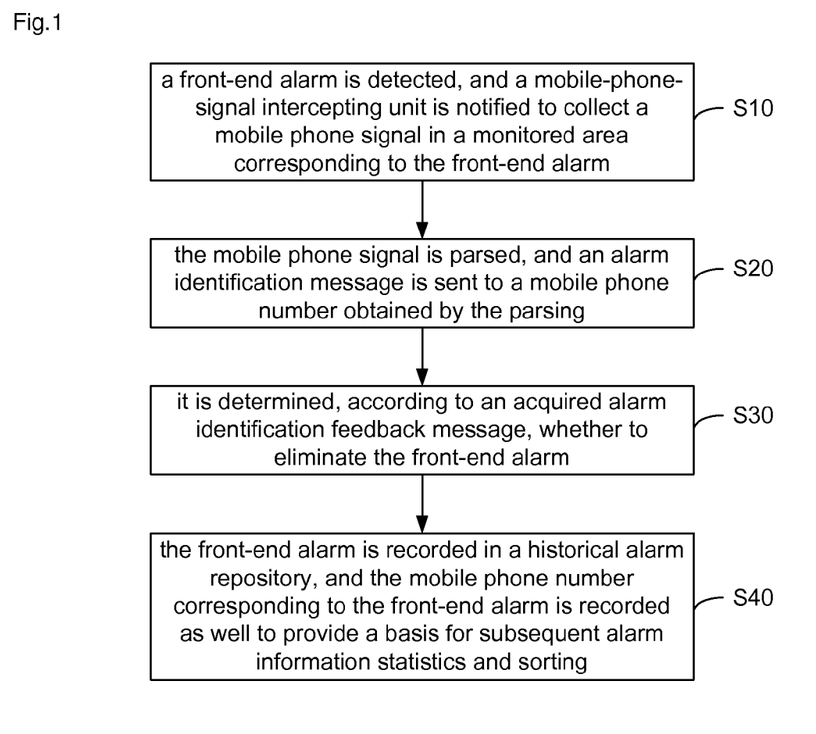
FIG. 1 is a flowchart of a method for alarm identification for a video surveillance system according to an embodiment herein.

As shown in FIG. 1, a method for alarm identification for a video surveillance system according to an embodiment herein may include steps as follows.

In S10, a front-end alarm is detected, and a mobile-phone-signal intercepting unit is notified to collect a mobile phone signal in a monitored area corresponding to the front-end alarm.

The mobile-phone-signal intercepting unit and the front end may be installed together in the monitored area.

In S20, the mobile phone signal is parsed, and an alarm identification message is sent to a mobile phone number obtained by the parsing.

The alarm identification message may include warning content. After a mobile phone terminal corresponding to the mobile phone number receives the alarm identification message, a user may return/feed back a message in response to the alarm identification message, according to prompting information in the alarm identification message, or according to the user's intention.

In S30, it is determined, according to an acquired alarm identification feedback message, whether to eliminate the front-end alarm.

In the step S10, the front-end alarm may include a motion-detected alarm and an access control alarm. In addition, it's easy for those skilled in the art to know that any other method for producing an alarm in the video surveillance system may apply as well, which is not enumerated herein.

According to an embodiment herein, in the step S20, the mobile phone signal may be parsed and an alarm identification message may be sent to a mobile phone number obtained in the parsing step with steps as follows.

In S201, the mobile phone signal may be parsed and the mobile phone number corresponding to the front-end alarm may be acquired.

In the step, parsing a mobile phone number according to a mobile phone signal is known in the art, and is not elaborated herein.

In S202, it may be determined, according to a preset alarm identification strategy, whether to send the mobile phone number corresponding to the front-end alarm the alarm identification message.

For example, the preset alarm identification strategy may be set as follows. When the mobile phone number obtained by the parsing matches a pre-stored mobile phone number of designated trusted personnel (such as managing personnel, maintenance personnel or other staff related to the monitored area), the alarm is determined as an identity-identified alarm, in which case no alarm identification message is sent to the mobile phone number corresponding to the front-end alarm. When the mobile phone number obtained by the parsing matches no preset trusted number, an alarm identification short message is sent to the mobile phone number corresponding to the front-end alarm. For example, the alarm identification short message may include a warning prompt. A switch may be set in the system, with which an alarm identification short message sending function may be turned off. The system may just perform alarm information and related mobile phone number collection and statistics.

According to an embodiment herein, after executing step S30, the method for alarm identification for a video surveillance system may further include a step as follows.

In S40, the front-end alarm is recorded in a historical alarm repository, and the mobile phone number corresponding to the front-end alarm is recorded as well to provide a basis for subsequent alarm information statistics and sorting.

It may be determined, according to an acquired alarm identification feedback message, whether to eliminate the front-end alarm with a step or steps as follows.

In S301, when no alarm identification feedback message corresponding to the alarm identification message is acquired within a preset waiting time, it may be determined, according to a preset first alarm eliminating strategy, whether to eliminate the front-end alarm; the front-end alarm may be labeled as an identity-unidentified alarm; and the labeled front-end alarm may be recorded in the historical alarm repository.

The preset waiting time may be set by those skilled in the art as needed, and is not limited herein.

The first alarm eliminating strategy may be set as follows. When no alarm identification feedback message returned by the mobile phone number corresponding to the front-end alarm is received within a specific period of time, it is impossible to analyze the mobile phone number. In this case, the alarm may be deemed as an identity-unidentified alarm.

Alternatively, in S302, when the alarm identification feedback message corresponding to the alarm identification message is acquired within the preset waiting time, it may be determined, according to a preset second alarm eliminating strategy, whether to eliminate the front-end alarm; the front-end alarm and the mobile phone number corresponding to the front-end alarm may be recorded in the historical alarm repository.

Likewise, the preset waiting time may be set by those skilled in the art as needed, and is not limited herein.

The second alarm eliminating strategy may be set as follows. When the mobile phone number matches a pre-stored mobile phone number of designated trusted personnel (such as managing personnel, maintenance personnel or other staff related to the monitored area), the alarm may be determined as an identity-identified alarm, in which case the front-end alarm is identified, and the front-end alarm and the mobile phone number corresponding to the front-end alarm may be recorded in the historical alarm repository as identified information.

When the mobile phone number obtained by the parsing matches no preset trusted number, an alarm identification short message is sent to the mobile phone number corresponding to the front-end alarm. For example, the alarm identification short message may include a warning prompt. A switch may be set in the system, with which an alarm identification short message sending function may be turned off. The system may just perform alarm information and related mobile phone number collection and statistics.

After receiving an alarm identification feedback message fed back by a user, the system may match an identification code in the message to a system-preset identification code. When the two codes match each other, the front-end alarm and the mobile phone number corresponding to the front-end alarm may be recorded in the historical alarm repository.

Figure 2:
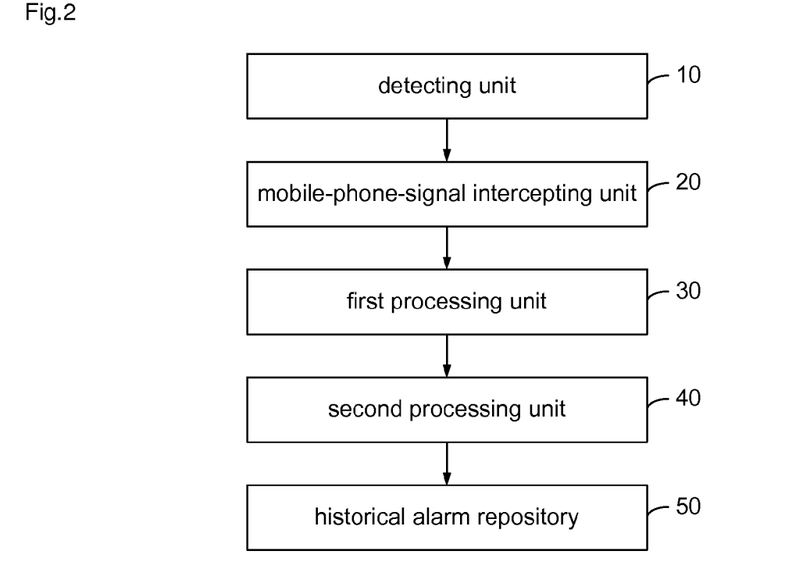
FIG. 2 is a schematic diagram of a structure of an apparatus for alarm identification for a video surveillance system according to an embodiment herein.

As shown in FIG. 2, an apparatus for alarm identification for a video surveillance system according to an embodiment herein may include:

a detecting unit 10 configured for: detecting a front-end alarm;

a mobile-phone-signal intercepting unit 20 configured for: when the detecting unit detects a front-end alarm, collecting a mobile phone signal in a monitored area corresponding to the front-end alarm;

a first processing unit 30 configured for: parsing the mobile phone signal, and sending an alarm identification message to a mobile phone number obtained by the parsing; and a second processing unit 40 configured for: determining, according to an acquired alarm identification feedback message, whether to eliminate the front-end alarm.

The detecting unit 10 may detect a front-end alarm including a motion-detected alarm and an access control alarm. In addition, it's easy for those skilled in the art to know that any other method for producing an alarm in a video surveillance system may apply as well, which is not enumerated herein.

The first processing unit 30 may parse the mobile phone signal and send an alarm identification message to a mobile phone number obtained in the parsing step by:

1. parsing the mobile phone signal and acquiring the mobile phone number corresponding to the front-end alarm; and 2. determining, according to a preset alarm identification strategy, whether to send the mobile phone number corresponding to the front-end alarm the alarm identification message.

For example, the preset alarm identification strategy may be set as follows. When the mobile phone number obtained by the parsing matches a pre-stored mobile phone number of designated trusted personnel (such as managing personnel, maintenance personnel or other staff related to the monitored area), the alarm is determined as an identity-identified alarm, in which case no alarm identification message is sent to the mobile phone number corresponding to the front-end alarm, otherwise an alarm identification message may be sent to the mobile phone number corresponding to the front-end alarm.

When the mobile phone number obtained by the parsing matches no preset trusted number, an alarm identification short message is sent to the mobile phone number corresponding to the front-end alarm. For example, the alarm identification short message may include a warning prompt. A switch may be set in the system, with which an alarm identification short message sending function may be turned off. The system may just perform alarm information and related mobile phone number collection and statistics.

The apparatus for alarm identification for a video surveillance system may further include:

a historical alarm repository 50 configured for: after the second processing unit 40 determines, according to the acquired alarm identification feedback message, whether to eliminate the front-end alarm, recording the front-end alarm in the historical alarm repository 50, and recording the mobile phone number corresponding to the front-end alarm to provide a basis for subsequent alarm information statistics and sorting.

The second processing unit 40 may determine, according to the acquired alarm identification feedback message, whether to eliminate the front-end alarm by:

when no alarm identification feedback message corresponding to the alarm identification message is acquired within a preset waiting time, determining, according to a preset first alarm eliminating strategy, whether to eliminate the front-end alarm; labeling the front-end alarm as an identity-unidentified alarm; and recording the labeled front-end alarm in the historical alarm repository 50.

The first alarm eliminating strategy may be set as follows. When no alarm identification feedback message returned by the mobile phone number corresponding to the front-end alarm is received within a specific period of time, it is impossible to analyze the mobile phone number. In this case, the alarm may be deemed as an identity-unidentified alarm.

Alternatively, the second processing unit 40 may determine, according to the acquired alarm identification feedback message, whether to eliminate the front-end alarm by: when the alarm identification feedback message corresponding to the alarm identification message is acquired within the preset waiting time, determining, according to a preset second alarm eliminating strategy, whether to eliminate the front-end alarm; and recording the front-end alarm and the mobile phone number corresponding to the front-end alarm in the historical alarm repository 50.

The second alarm eliminating strategy may be set as follows. When the mobile phone number matches a pre-stored mobile phone number of designated trusted personnel (such as managing personnel, maintenance personnel or other staff related to the monitored area), the alarm may be determined as an identity-identified alarm, in which case the front-end alarm is identified, and the front-end alarm and the mobile phone number corresponding to the front-end alarm may be recorded in the historical alarm repository 50 as identified information.

When the mobile phone number obtained by the parsing matches no preset trusted number, an alarm identification short message is sent to the mobile phone number corresponding to the front-end alarm. For example, the alarm identification short message may include a warning prompt. A switch may be set in the system, with which an alarm identification short message sending function may be turned off. The system may just perform alarm information and related mobile phone number collection and statistics.

After receiving an alarm identification feedback message fed back by a user, the system may match an identification code in the message to a system-preset identification code. When the two codes match each other, the front-end alarm and the mobile phone number corresponding to the front-end alarm may be recorded in the historical alarm repository.

Note that the detecting unit 10 in an embodiment herein may be implemented by a detector with an alarm detecting function, the mobile-phone-signal intercepting unit 20 may be implemented by a mobile phone signal collector, the first processing unit 30 and the second processing unit 40 may be implemented by a central processing unit (CPU) or a digital signal processing (DSP) chip of an alarm identification apparatus, and the historical alarm repository 50 may be implemented by hardware memory such as a hard disk or the like.

A video surveillance system according to an embodiment herein may include an aforementioned apparatus for alarm identification for a video surveillance system. Referring to FIG. 2, the apparatus may include:

a detecting unit 10 configured for: detecting a front-end alarm;

a mobile-phone-signal intercepting unit 20 configured for: when the detecting unit 10 detects a front-end alarm, collecting a mobile phone signal in a monitored area corresponding to the front-end alarm;

a first processing unit 30 configured for: parsing the mobile phone signal, and sending an alarm identification message to a mobile phone number obtained by the parsing; and a second processing unit 40 configured for: determining, according to an acquired alarm identification feedback message, whether to eliminate the front-end alarm.

The method for providing a video surveillance system with alarm identification and recording a historical alarm as well as a mobile phone number in a monitored area when the alarm occurs, as mentioned herein, will be elaborated below with reference to FIG. 3 to FIG. 6.

Figure 3:
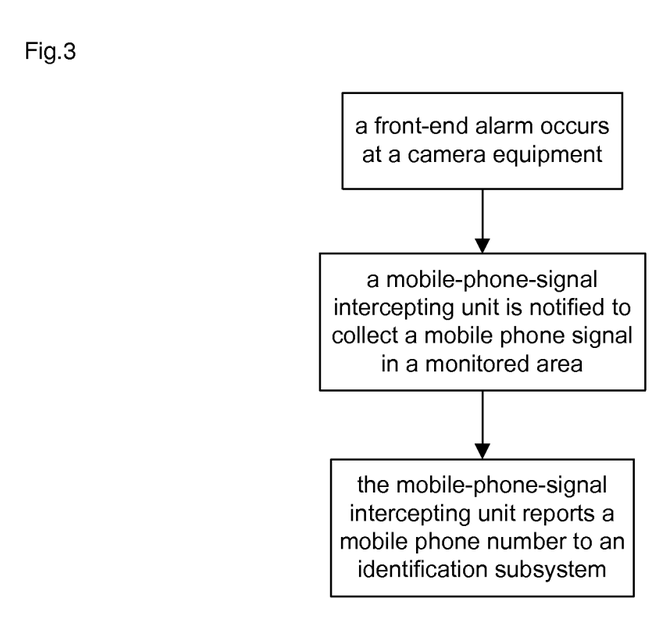
FIG. 3 is a flowchart of notifying, when a front-end alarm occurs, a mobile-phone-signal intercepting unit to collect and report a mobile phone number according to an embodiment herein.

In step 1, as shown in FIG. 3, after a front-end alarm appears at camera equipment, a video surveillance system may notify a mobile-phone-signal intercepting unit 20 to collect a mobile phone signal appearing in a monitored area. The mobile-phone-signal intercepting unit 20 may report a collected mobile phone number to an identification subsystem in the video surveillance system.

Figure 4:
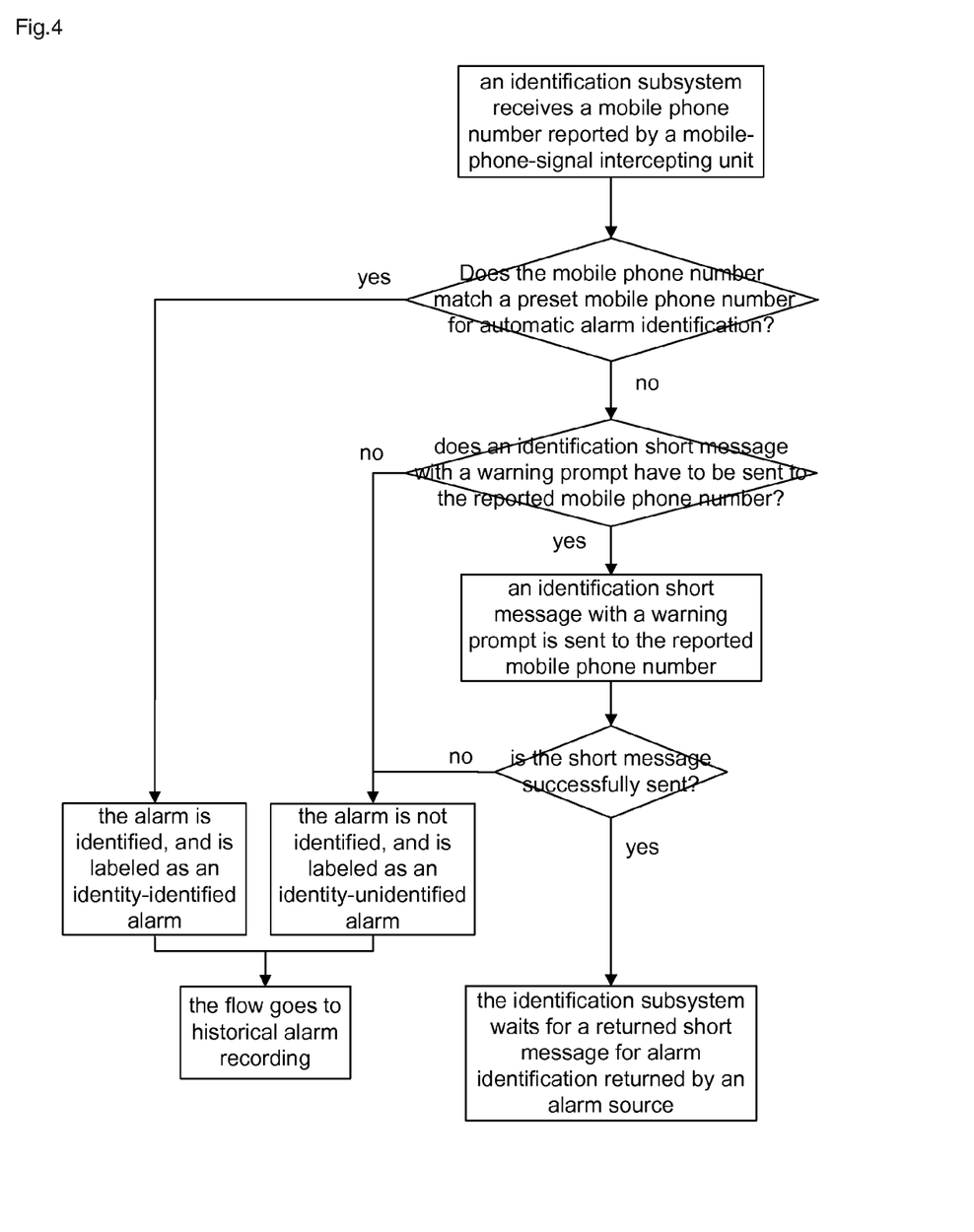
FIG. 4 is a flowchart of determining, by an identification subsystem, a mobile phone number and sending an alarm identification short message according to an embodiment herein.

In step 2, as shown in FIG. 4, after receiving the reported mobile phone number, the identification subsystem may analyze, according to a preset related condition, the mobile phone number, and send, according to the result of the analysis, the mobile phone number an identification short message with a warning prompt (namely, an alarm identification message) with specific steps as follows.

In A1, it is determined whether the reported mobile phone number match a preset mobile phone number for automatic alarm identification; when they do match, the alarm is identified automatically, and is labeled as an identity-identified alarm, and the flow goes to historical alarm recording described in step 4; when they do not match, the flow goes to step B1.

A preset mobile phone number for automatic alarm identification may be a mobile phone number preset in the identification subsystem, such as the mobile phone number of an internal administrator.

By matching, it means that a video surveillance alarm system analyzes a number of alarm sources appearing in the alarm area, performs complete determination according to a number of collected mobile phone numbers. For example, there may be 3 mobile phone numbers reported to appear in the monitored area. However, there is only one preset mobile phone number for automatic alarm identification. Thus, at most one of the reported mobile phone numbers can be matched with the one preset mobile phone number for automatic alarm identification. Such a case is therefore not deemed as a matching case.

In B1, it may be determined whether an identification short message with a warning prompt has to be sent to a reported mobile phone number; the flow goes to step C1 when the message has to be sent; otherwise the alarm is labeled as an identity-unidentified alarm, and the flow goes to step 4.

In C1, the identification subsystem may send the reported mobile phone number an identification short message with a warning prompt; the flow goes to step 3 after the message is sent successfully, the identification subsystem waits for and processes a returned short message for alarm identification returned by an alarm source; otherwise when the message fails to be sent, the alarm is labeled as an identity-unidentified alarm and the flow goes to step 4.

An identification short message with a warning prompt may be compiled and/or configured beforehand in the identification subsystem, and mainly serves to warn that an alarm source has entered an area and triggered a type of alarm, and to prompt an alarm source to perform authentication/identification by replying the short message using an identifying code.

Figure 5:
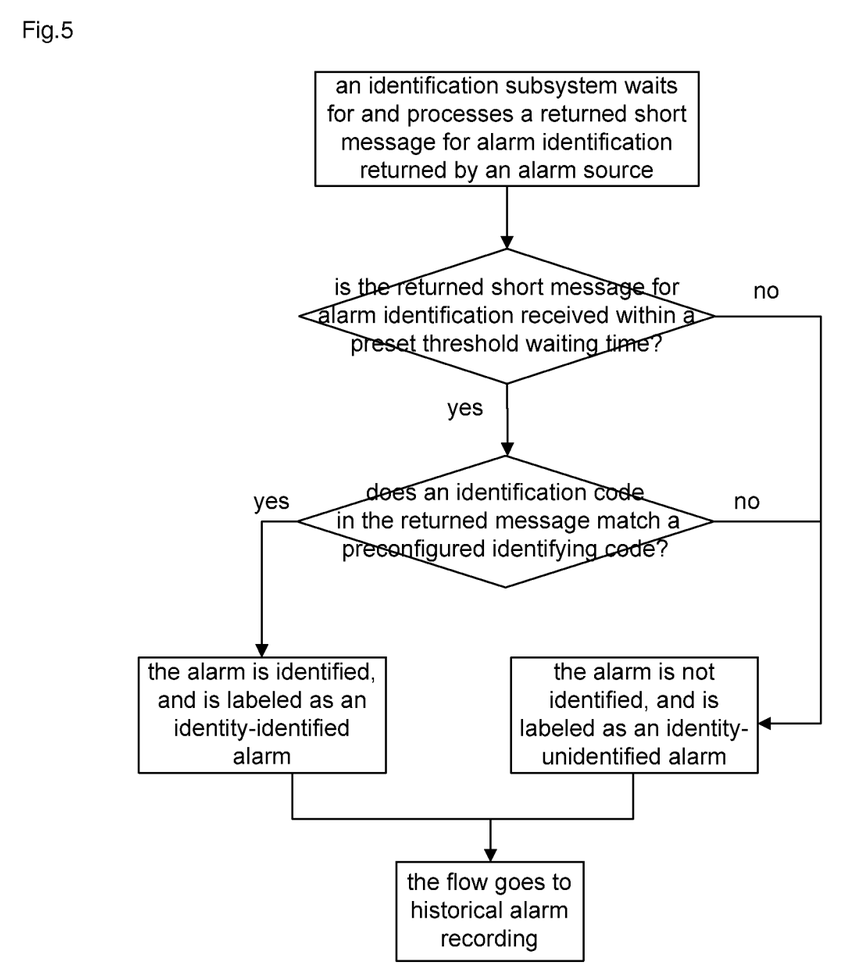
FIG. 5 is a flowchart of processing, by an identification subsystem, a returned short message for alarm identification according to an embodiment herein.

In step 3, as shown in FIG. 5, the identification subsystem may wait for and then process a returned short message (a short message reply) for alarm identification returned by an alarm source, specifically by steps as follows.

In A2, when no returned short message for alarm identification is received within a preset threshold waiting time, it may be deemed as that no alarm identification is performed for the alarm, the alarm is labeled as an identity-unidentified alarm and the flow goes to step 4.

In B2, when a returned short message for alarm identification is received within a preset threshold waiting time, the identification subsystem may determine whether an identification code in the returned message matches a system-preconfigured identification code; when the codes match, the alarm is identified automatically, and is labeled as an identity-identified alarm, and the flow goes to historical alarm recording described in step 4; when the codes do not match each other, the alarm is labeled as an identity-unidentified alarm and the flow goes to step 4.

Figure 6:
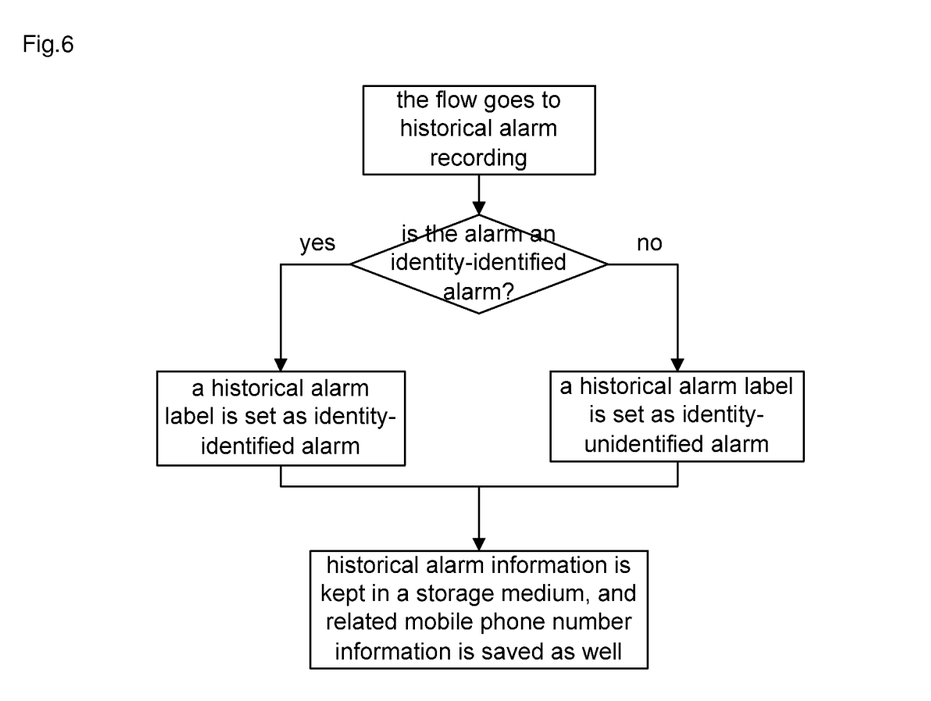
FIG. 6 is a flowchart of recording a historical alarm according to an embodiment herein.

In step 4, as shown in FIG. 6, after the identification subsystem processes alarm information, the alarm flow goes to historical alarm recording, with specific steps as follows.

In A3, after the identification subsystem processes alarm information, when the alarm is an identity-unidentified alarm, a historical alarm label is set as identity-unidentified alarm, and the flow goes to step B3; when the alarm is an identity-identified alarm, a historical alarm label is set as identity-identified alarm, and the flow goes to step B3.

In B3, after a historical alarm label is set in step A3, in addition to saving alarm information and alarm-related information in a storage medium, a mobile phone number appearing in the monitored area when the alarm occurs may be saved. An identified mobile phone number and an unidentified mobile phone number may be displayed respectively on a historical alarm retrieving interface.

Note that according to step 4, when recording a historical alarm, a mobile phone number appearing in the monitored area when the alarm is produced may be recorded simultaneously. The flow may focus on recording respectively an identified number or an unidentified number according to a final state of alarm information (identity-unidentified alarm or identity-identified), providing an effective identity basis for subsequent alarm information statistics and sorting may.

What described are merely embodiments of the disclosure, and are not intended to limit the scope of the disclosure. All equivalent structures or flow variations made using content of the specification and accompanying drawings of the disclosure, or direct or indirect application in another related technical field, likewise fall within the scope of the disclosure.

The invention claimed is:

1. A method for alarm identification for a video surveillance system, comprising:
   detecting a front-end alarm, and notifying a mobile-phone-signal intercepting unit to collect a mobile phone signal in a monitored area corresponding to the front-end alarm;
   parsing the mobile phone signal, and sending an alarm identification message to a mobile phone number obtained by the parsing; and
   determining, according to an acquired alarm identification feedback message, whether to eliminate the front-end alarm,
   wherein the method further comprises: after the determining, according to an acquired alarm identification feedback message, whether to eliminate the front-end alarm,
   recording the front-end alarm in a historical alarm repository, and recording the mobile phone number corresponding to the front-end alarm to provide a basis for subsequent alarm information statistics and sorting,
   wherein the determining, according to an acquired alarm identification feedback message, whether to eliminate the front-end alarm comprises:
   when no alarm identification feedback message corresponding to the alarm identification message is acquired within a preset waiting time, determining, according to a preset first alarm eliminating strategy, whether to eliminate the front-end alarm; labeling the front-end alarm as an identity-unidentified alarm; and recording the labeled front-end alarm in the historical alarm repository;
   or, when the alarm identification feedback message corresponding to the alarm identification message is acquired within the preset waiting time, determining, according to a preset second alarm eliminating strategy, whether to eliminate the front-end alarm; and recording the front-end alarm and the mobile phone number corresponding to the front-end alarm in the historical alarm repository.

2. The method according to claim 1, wherein the front-end alarm comprises a motion-detected alarm and an access control alarm.

3. The method according to claim 1, wherein the step of parsing the mobile phone signal, and sending an alarm identification message to a mobile phone number obtained by the parsing comprises:
   parsing the mobile phone signal and acquiring the mobile phone number corresponding to the front-end alarm; and
   determining, according to a preset alarm identification strategy, whether to send the mobile phone number corresponding to the front-end alarm the alarm identification message.

4. An apparatus for alarm identification for a video surveillance system, comprising:
   a detecting unit configured for detecting a front-end alarm;

a mobile-phone-signal intercepting unit configured for: when the detecting unit detects a front-end alarm, collecting a mobile phone signal in a monitored area corresponding to the front-end alarm;

a first processing unit configured for: parsing the mobile phone signal, and sending an alarm identification message to a mobile phone number obtained by the parsing; and a second processing unit configured for: determining, according to an acquired alarm identification feedback message, whether to eliminate the front-end alarm, wherein the apparatus further comprises:

a historical alarm repository configured for: after the second processing unit determines, according to the acquired alarm identification feedback message, whether to eliminate the front-end alarm, recording the front-end alarm in the historical alarm repository, and recording the mobile phone number corresponding to the front-end alarm to provide a basis for subsequent alarm information statistics and sorting, wherein the second processing unit is configured for: determining, according to the acquired alarm identification feedback message, whether to eliminate the front-end alarm by:

when no alarm identification feedback message corresponding to the alarm identification message is acquired within a preset waiting time, determining, according to a preset first alarm eliminating strategy, whether to eliminate the front-end alarm; labeling the front-end alarm as an identity-unidentified alarm; and recording the labeled front-end alarm in the historical alarm repository;

or, when the alarm identification feedback message corresponding to the alarm identification message is acquired within the preset waiting time, determining, according to a preset second alarm eliminating strategy, whether to eliminate the front-end alarm; and recording the front-end alarm and the mobile phone number corresponding to the front-end alarm in the historical alarm repository.

5. The apparatus according to claim 4, wherein the front-end alarm comprises a motion-detected alarm and an access control alarm.

6. The apparatus according to claim 4, wherein the first processing unit is configured for parsing the mobile phone signal and sending an alarm identification message to a mobile phone number obtained by the parsing by:

parsing the mobile phone signal and acquiring the mobile phone number corresponding to the front-end alarm; and determining, according to a preset alarm identification strategy, whether to send the mobile phone number corresponding to the front-end alarm the alarm identification message.

7. A video surveillance system, comprising the apparatus for alarm identification for a video surveillance system according to claim 4.

8. The system according to claim 7, wherein the front-end alarm comprises a motion-detected alarm and an access control alarm.

9. The system according to claim 7, wherein the first processing unit is configured for parsing the mobile phone signal and sending an alarm identification message to a mobile phone number obtained by the parsing by:

parsing the mobile phone signal and acquiring the mobile phone number corresponding to the front-end alarm; and determining, according to a preset alarm identification strategy, whether to send the mobile phone number corresponding to the front-end alarm the alarm identification message.

* * * * *